H. H. KRECHMER AND W. E. COHEN.
SNAP FASTENER.
APPLICATION FILED MAY 28, 1920. RENEWED JUNE 28, 1921.
1,391,640.
Patented Sept. 20, 1921.
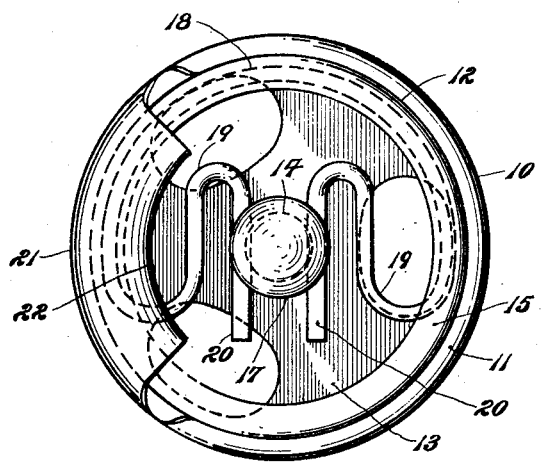
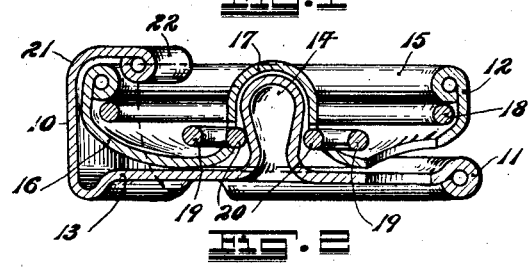
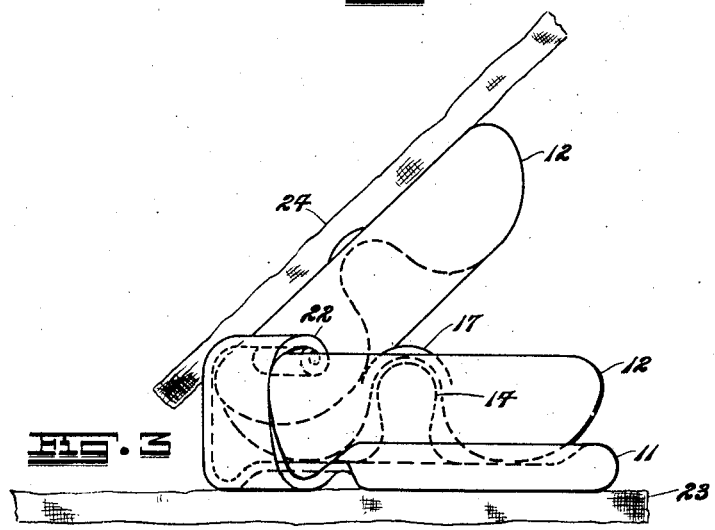
Harry H. Krechmer & William E. Cohen
INVENTORS.
Alfred T. Bratton
WITNESS;
BY Victor J. Evans
ATTORNEY.

UNITED STATES PATENT OFFICE.

HARRY H. KRECHMER AND WILLIAM E. COHEN, OF PHILADELPHIA, PENNSYLVANIA.

SNAP-FASTENER.

1,391,640. Specification of Letters Patent. Patented Sept. 20, 1921.

Application filed May 28, 1920, Serial No. 385,048. Renewed June 28, 1921. Serial No. 481,167.

*To all whom it may concern:*

Be it known that we, HARRY H. KRECHMER and WILLIAM E. COHEN, citizens of the United States, residing at Philadelphia, in the county of Philadelphia and State of Pennsylvania, have invented new and useful Improvements in Snap-Fasteners, of which the following is a specification.

The object of our present invention is the provision of a snap fastener of strong and durable construction equipped with a view to precluding casual disconnection of the male and female parts of the fastener.

The invention comprehends among other features, separable fasteners generally known in the trade as snap fasteners and in connection with which one of the fastening devices is provided with a suitable overlying guard with which the other fastener is to be associated when it is arranged in position to prevent the accidental disengagement of the fastener.

It is well known that in the use of the ordinary fastener now generally found on the market, the male and female parts of the fasteners when relatively engaged, even though secured by a spring action are not so firmly held together that they cannot become accidentally disengaged and in order to overcome this defect in the use of snap fasteners, use is made of an additional part or guard which may be formed with one of the parts of the fasteners and which when constituting a part of the male portion of the fastener, will be associated with the female portion of the fastener when the latter is engaged with the male portion to prevent the two parts of the fasteners from accidentally coming apart.

In the further disclosure of the invention, reference is to be had to the accompanying drawings constituting a part of this specification, in which similar characters of reference denote corresponding parts in all the views, and in which—

Figure 1— is an enlarged plan view of a snap fastener showing the two parts associated.

Fig. 2— is a vertical sectional view taken through the structure shown in Fig. 1, and Fig. 3— is a diagrammatic elevation of the snap fastener showing the manner of arranging the female part relative to the male part for the locking or unlocking of the former relative to the latter.

Referring more particularly to the views the snap fastener, indicated in its entirety by the numeral 10, comprises generally two parts 11, 12, the former constituting the male part and the latter the female part. The male part may be suitably formed or stamped to provide a plate or disk 13 having an upwardly struck knob or head 14, whereas the female part is preferably formed in the nature of a ring 15 having a depending plate 16 which is recessed at its central portion to provide a seat or socket 17 for the head 14 with a semi-circular spring 18 disposed to be carried beneath the ring 15 and have curved portions 19 arranged to work through opposite apertures in the socket 17 and to lie adjacent to the head 14 when the fastener is assembled so that parallel parts 20 of the spring will engage the shank of the head.

As mentioned heretofore, the main parts of the snap fastener both as to the male and female portions may be stamped from sheet metal or the like, and the male part 11 preferably has the plate 13 formed with an offset upwardly extending flanged guard 21, arranged to extend substantially a quarter of the distance of the circumference of the plate and overlying a portion of the ring 15 when the female part of the fastener has been attached to or associated with the male part, as clearly shown in Figs. 1 and 2. The flanged portion of the guard 21 may be formed by an inwardly turned part 22 and assuming that the male part of the fastener has been attached to the edge of an article of clothing 23 and the female part attached adjacent the edge of another part 24 of the clothing, it will be seen by reference to Fig. 3, that in the process of connecting the two parts of the clothing, the female part of the clasp is first arranged beneath the guard 21 and then snapped in closed position with the socket 17 receiving the head 14 and it will now be clear that if a pull is exerted on the part 24 of the clothing, the overlying portion of the guard engaged by the under-lying portion of the female part, will prevent the female part of the fastener from becoming disengaged from the male part and thus the usual tendency of the two parts to become accidentally separated is readily obviated by the mere provision of a guard of the character and shape described.

Having described our invention, we claim—

1. In a snap fastener, a female member having a cupped plate shaped to form a central socket with opposite openings in the side wall thereof and also shaped to form an interior bead at its edge, and a spring carried by said member within the bead thereof and having terminal portions arranged to work through the apertures in the socket wall, in combination with a male member having a plate shaped to form a head to enter the socket of the female member and be engaged by the terminal portions of the spring and also having on said plate a guard of angular form in cross section arranged to straddle the periphery of the female member and terminating in a bead arranged at the inner side of its end and adapted to snap into engagement with the bead of the female member.

2. A snap fastener comprising a cupped female member having a socket and spring means coöperating therewith and also having an interior bead on its edge, and a male member having a head and also having a guard of angular form in cross section arranged to straddle the periphery of the female member and terminating at its end in a bead arranged at the inner side of said end and adapted to spring into and out of engagement with the bead of the first-named member.

In testimony whereof we affix our signatures.

HARRY H. KRECHMER.
WILLIAM E. COHEN.